Patented Sept. 17, 1929

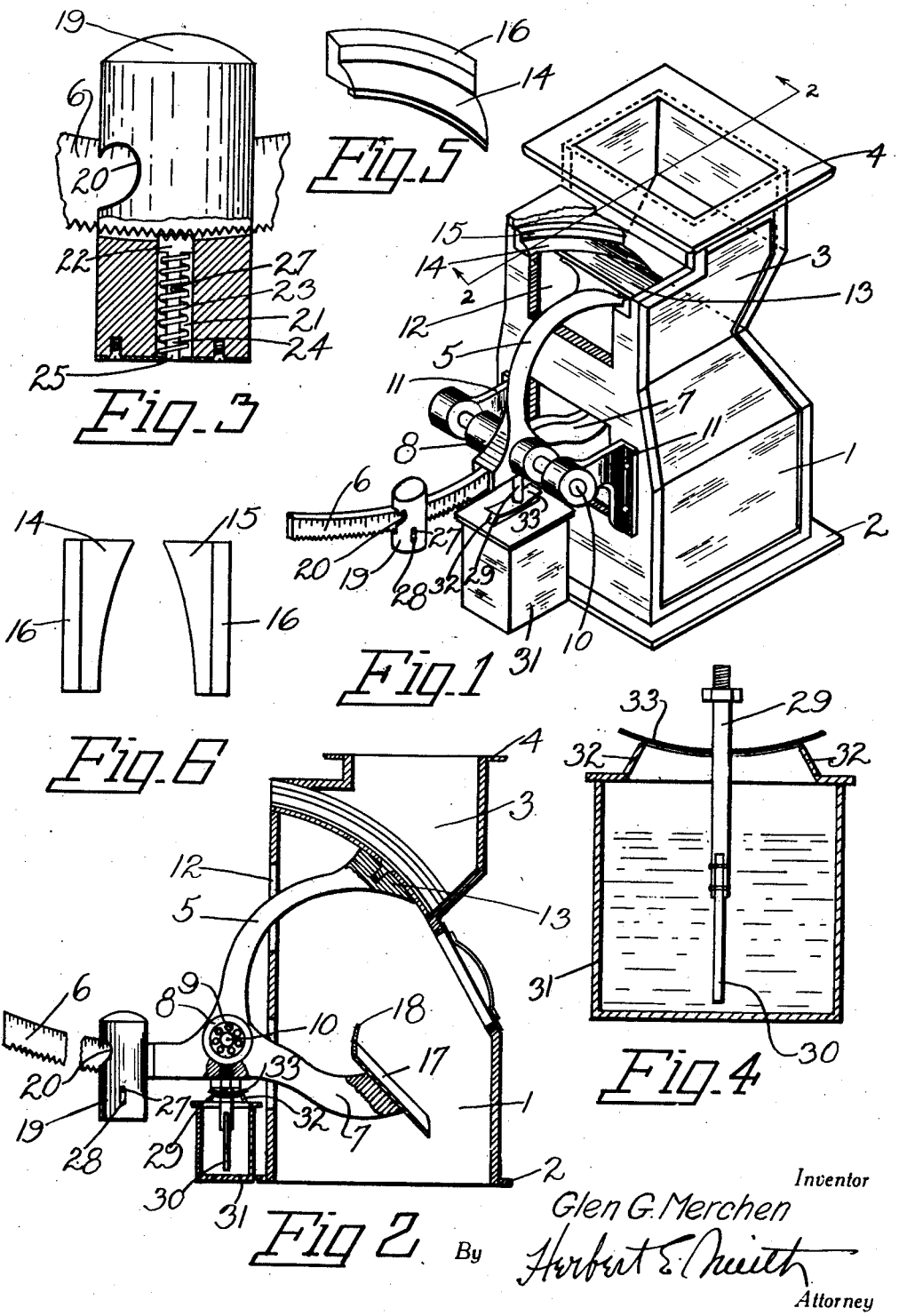

1,728,429

UNITED STATES PATENT OFFICE

GLEN G. MERCHEN, OF SPOKANE, WASHINGTON

AUTOMATIC WEIGHING MACHINE

Application filed March 7, 1928. Serial No. 259,729.

My present invention relates to an improved automatic weighing machine for use in blending grain. In the blending or mixing of grains according to my invention, one of the machines is used in connection with each grain bin from which the grains are to be drawn for blending or mixing, and each machine is capable of governing or controlling the flow of grain from its bin. Thus, after the machines are started in operation, a plurality of streams of grain are automatically maintained in predetermined proportions, and as these streams of grain flow to the receiving bin the blend or mixture in the receiving bin is made up of various grains to insure the desired blend for milling, as in flour mills. Each of the machines is automatic in its control and utilizes a predetermined flow of grain in connection with a counterbalancing weight to insure a steady and uniformly flowing stream of grain from the supply bin to the receiving or blending bin.

The operation of the control machine is governed by the use of a counterbalancing weight, that may of course be adjusted, simultaneously in connection with the feed gate or medium for controlling the flow of grain, and the weight is maintained in its correct position by impact of the flowing grain from the feed gate, upon a control pan or tray. The invention consists in certain novel combinations and arrangements of parts involving the use of the counterweighted feed control device, and connections, as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a perspective view of one of the weighing machines, embodying my invention.

Figure 2 is a vertical sectional view, as at line 2—2 of Figure 1 showing the feed gate closed.

Figure 3 is an enlarged sectional detail view of the counterweight.

Figure 4 is an enlarged sectional view of the stabilizer device for the counterbalanced control device.

Figure 5 is a perspective view of one of the stationary feed plates with which the feed gate co-acts.

Figure 6 is a plan view of the spaced feed plates for co-acting with the feed gate for controlling the flow of grain by reducing or increasing the area of the space through which the grain may flow.

In carrying out my invention I utilize a case or box 1 of suitable size, shape and material that is fashioned with an attaching flange 2 for securing it to the receiving bin, and at its upper part the case is fashioned as an inlet feed hopper 3 that may be attached as by flange 4 to the feed bin or the feed chute from the supply or feed bin.

Within the case is contained a three-armed, oscillatable, counterbalanced, control device fashioned with the rigidly connected arms 5, 6, and 7 and hub 8, the latter being provided with ball bearings 9 on the pivot pin or rod 10 that is supported outside the box or case in brackets 11.

The arm 5 is adapted to swing in a slot 12 in the front wall of the case, and at its free end this arm is equipped with a feed gate 13 in the form of a curved plate secured at the end of the arm.

The curved feed gate is adapted to co-act with a pair of spaced, complementary curved feed plates 14 and 15 fixed within the case in the bottom of the feed hopper, and when the gate is closed as in Figure 2, the gate and spaced plates form a closed bottom for the hopper to prevent flow or feed of grain from the hopper portion of the case to the lower, discharge end of the case. The volume of the stream of grain flowing from the hopper is governed by the area of the opening between the two feed plates, and the area of this opening is governed by the position of the gate with relation to the space between the plates. The two plates are fashioned with side and end flanges 16 to prevent displacement of the grain and to insure a flow of the grain into the space between the plates that is uncovered or not covered by the gate.

The stream of grain flowing through the open gate falls by gravity upon a counterbalancing pan or tray 17 fashioned with edge and back flanges 18 and rigidly fixed at the free end of the arm 7 that projects into the lower or discharge end of the case. The weight or impact of the stream of grain continuously flowing through the gate and striking the counterbalancing pan, counterbalances the weight 19 that is adjustable and carried on the arm 6 which forms the scale beam for the machine. Thus by adjusting the weight 19 on the scale beam the gate 13 is opened a sufficient distance to permit flow therethrough of the required quantity of grain which, striking the counterbalancing tray 17, counterbalances the weight 19 and maintains the gate in its predetermined open position. Of course the farther the weight is moved on its beam from the axis 10, the wider the gate is opened, and the wider the gate is opened the heavier is the weight of the flowing stream of grain that impacts on the counterbalancing tray and then passes through the lower end of the case to the receiving bin.

The beam 6 as shown is curved upwardly and the weight which is slotted at 20 is slidable on the beam and in position to be suspended in upright or vertical position regardless of the location on the curved beam. A recess or hole 21 is provided in the weight for the locking plunger-head 22 that is forced by the spring 23 in contact with the notches of the curved beam. The stem of the plunger, as 24 passes through the spring and into a hole 25 in the closure plate 26 on the bottom of the weight that closes the recess 21, and the spring normally holds the plunger head in position on the beam. To release the plunger in order that the weight may be adjusted, pressure may be applied to the pin 27 of the stem, which pin projects through a slot 28 in the weight and is readily accessible to the thumb for moving.

The counterbalanced, oscillatable, control device is stabilized, to prevent undue vibrations, and for this purpose a rod 29 is attached to the hub portion of the device and provided with a blade or paddle 30 that is immersed or submerged in a liquid, as oil, contained in the pot 31. The pot is fashioned with a slotted hood or top 32 to permit swinging movement of the rod or pendulum 29, and a shield 33 is attached to the pendulum to prevent access of dust to the interior of the pot 31.

Excessive swinging or vibration of the three-armed device is prevented or retarded by the stabilizing movement of the pendulum-paddle 30 in the liquid of the pot 31, and the counterbalanced device, after having been set to its predetermined adjustment, is maintained in its adjusted position and controlled by the flow of grain as heretofore described.

Having thus fully described my invention, what I claim as new and desire to secure by Letters Patent is—

1. In a feed control device the combination with a slotted casing, a hopper, and a pair of spaced plates forming an open bottom for the hopper, of a pivoted mechanism comprising an exterior curved arm forming a scale beam and a weight on the beam, a second arm projecting through the slotted casing and a gate at its end for co-action with said spaced plates, a third arm projecting through the slotted casing and a tray on the third arm to receive impact from flowing grain and counterbalance the beam and hold the gate in adjusted position.

2. The combination with a curved scale beam having a pivot hub, and an adjustable weight on the beam, of a feed gate rigid with the beam, a feed hopper adjacent to the gate, a tray rigid with said beam adapted to receive impact from flowing material to counterbalance the beam, and means for stabilizing the beam comprising a rod rigid with the beam, a blade on the beam, and a liquid container in which the blade is submerged.

In testimony whereof I affix my signature.

GLEN G. MERCHEN.